(12) United States Patent
Wang et al.

(10) Patent No.: US 11,091,587 B2
(45) Date of Patent: Aug. 17, 2021

(54) WOOL-LIKE POLYESTER FILAMENT AND PREPARING METHOD THEREOF

(71) Applicant: JIANGSU HENGLI CHEMICAL FIBRE CO., LTD., Wujiang (CN)

(72) Inventors: Shanshui Wang, Wujiang (CN); Lili Wang, Wujiang (CN); Jiangen Shen, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 17/042,127

(22) PCT Filed: Oct. 28, 2019

(86) PCT No.: PCT/CN2019/113619
§ 371 (c)(1),
(2) Date: Sep. 27, 2020

(87) PCT Pub. No.: WO2020/134488
PCT Pub. Date: Jul. 2, 2020

(65) Prior Publication Data
US 2021/0009755 A1    Jan. 14, 2021

(30) Foreign Application Priority Data

Dec. 27, 2018  (CN) .......................... 201811613986.4

(51) Int. Cl.
| | | |
|---|---|---|
| *C08K 13/02* | (2006.01) | |
| *C08G 63/682* | (2006.01) | |
| *C08G 63/85* | (2006.01) | |
| *C08K 3/22* | (2006.01) | |
| *C08K 3/38* | (2006.01) | |
| *C08K 5/521* | (2006.01) | |
| *C08K 5/524* | (2006.01) | |
| *D01F 6/92* | (2006.01) | |

(52) U.S. Cl.
CPC ......... *C08G 63/6826* (2013.01); *C08G 63/85* (2013.01); *C08K 3/22* (2013.01); *C08K 3/38* (2013.01); *C08K 5/521* (2013.01); *C08K 5/524* (2013.01); *C08K 13/02* (2013.01); *D01F 6/92* (2013.01); *C08K 2003/2241* (2013.01)

(58) Field of Classification Search
CPC ...... C08G 63/80; C08G 63/183; C08G 63/78; C08G 63/6826; C08G 63/85; D01D 5/096; D01D 6/84; D01D 11/08; C08K 13/02; C08K 5/524; C08K 3/38; C08K 5/521; C08K 3/22; C08K 2003/2241; D01F 6/92
USPC .......................................................... 264/167
See application file for complete search history.

(56) References Cited

U.S. PATENT DOCUMENTS

| | | | | |
|---|---|---|---|---|
| 5,916,677 | A * | 6/1999 | Chen .................... | C08G 63/183 264/176.1 |
| 6,645,619 | B2 * | 11/2003 | Kato .................. | C08G 63/6886 264/176.1 |
| 2006/0036012 | A1 | 2/2006 | Hayes et al. | |
| 2007/0249773 | A1 * | 10/2007 | Becker ...................... | D01F 1/04 524/492 |
| 2007/0299236 | A1 | 12/2007 | Kim et al. | |
| 2016/0369088 | A1 * | 12/2016 | Alidedeoglu .......... | C08L 67/02 |
| 2020/0223981 | A1 * | 7/2020 | Fan ........................ | D01D 5/096 |
| 2020/0263325 | A1 * | 8/2020 | Fan ........................ | D01F 6/62 |
| 2020/0263333 | A1 * | 8/2020 | Song ...................... | D04B 39/04 |

FOREIGN PATENT DOCUMENTS

| | | |
|---|---|---|
| CN | 103526325 A | 1/2014 |
| CN | 104480567 A | 4/2015 |
| CN | 108130605 A | 6/2018 |
| CN | 109750372 A | 5/2019 |

* cited by examiner

*Primary Examiner* — Hannah J Pak
(74) *Attorney, Agent, or Firm* — Bayramoglu Law Offices LLC

(57) ABSTRACT

A type of wool-like polyester filament and preparing method thereof are disclosed. The preparing method is manufacturing filament from a modified polyester through a POY process and a successive DTY processes, wherein the modified polyester is the product of the esterification and the successive polycondensation reactions of evenly mixed terephthalic acid, 1,4-butanediol, fluorinated dicarboxylic acid, tert-butyl branched hexanediol and 2,5,6,6-tetramethyl-2,5-heptanediol. The obtained fiber has a dye uptake of 90.32-93.27% and a K/S value of 22.15-23.42 when dyed at 100° C., and has an intrinsic viscosity drop of 17-20% when stored at 25° C. and R.H. 65% for 60 months. This invention features a method with ease of application and a product with good dyeing and degradation performance.

16 Claims, 1 Drawing Sheet

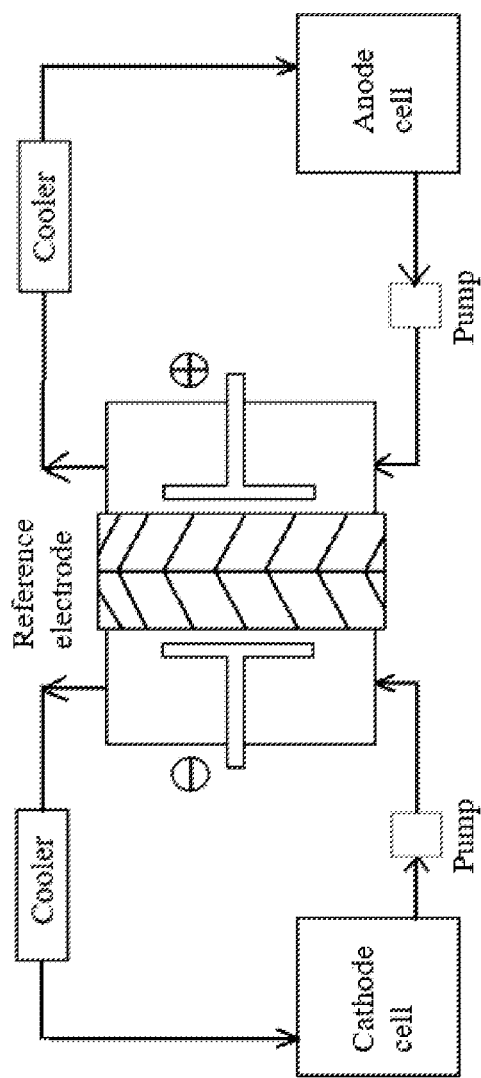

WOOL-LIKE POLYESTER FILAMENT AND PREPARING METHOD THEREOF

CROSS REFERENCE TO THE RELATED APPLICATIONS

This application is the national phase entry of International Application No. PCT/CN2019/113619, filed on Oct. 28, 2019, which is based upon and claims priority to Chinese Patent Application No. 201811613986.4, filed on Dec. 27, 2018, the entire contents of which are incorporated herein by reference.

TECHNICAL FIELD

The present invention belongs to the field of polyester fiber and relates to one type of wool-like polyester filament and preparing method thereof, and more particularly, relates to the method of preparing wool-like polyester filament through modification for polybutylene terephthalate.

BACKGROUND

Polybutylene terephthalate (PBT) filament has appreciable application prospect and draws more and more attention form textile circles because its advantages such as excellent elasticity, soft handle, easy to dye, crease resistance, mothproof, fungiproof, heat resistance, wash resistance and easy to crimp, etc. With the continuous improvement of living standards in modern society, the requirement for the quantity and quality of the fiber material in the field of clothing, decoration and industrial polyester has become higher and higher. To this end, it is necessary to develop the differential fibers with novel performance and added value.

Being smooth and uniform cylinders from the longitudinal view, common polyester fibers are of poor coherent due to their smooth surface. Therefore, the ends of polyester fiber are easy to expose outside the fabrics to form villi or further to cause pilling. At the same time, polyester fiber is also easy to generate static electricity under friction because of its poor hygroscopicity and conductivity. In view of the above problems of ordinary circular cross-section fiber, the industry has carried out relevant research on the profiled polyester fibers. The study found that the polyester fibers with flat shaped, ribbon shaped or dumbbell shaped cross-section have similar handle and luster of wool and rabbit hair, and the luster, which can improve the luster, fluffiness, moisture absorption, elasticity, handle and filling properties of the fabric to a certain extent, as well as promising the pilling resistance to the fabric. To shape the cross section of PBT fiber into flat, ribbon or dumbbell will bring the wool-like handle, together with the soft nylon like handle and the excellent fluffiness of PBT itself, which can provide both soft handle and good elasticity to the PBT fabrics with an economical cost.

PBT fiber, with a hydrophobicity and inertia manner, shows an unsatisfied dyeability. In addition, PBT fiber possesses a type of partly crystallized supramolecular structure, specifically, a coexistence state of crystalline regions composed of parallel molecular chains mostly in trans-conformation and amorphous regions composed of molecular chains mostly in cis-conformation, and such tight molecular arrangement increases the dyeing difficulty of PET fiber even more. At present, conventional PBT fiber is usually dyed with disperse dyes at high temperature (130° C.) and high pressure to ensure the dye uptake. However, the requirement of specific equipment and high energy consumption originated from the high temperature and high pressure dyeing, together with the long time consumption resulted from the dyeing difficulty mentioned above, the cost of PBT fiber dyeing is rather high, which has restricted the application of colored PBT fiber to some extent.

Furthermore, with the rapid development of PBT industry, although PBT will not directly cause harm to the environment, the difficulties in the PBT waste treatment can indirectly increase environmental pressure due to its huge amount and strong resistance to atmospheric and microbial degradation. In present, landfill, incineration and recovery are the main methods to treat PBT waste, from the environmental protection point of view, landfill and incineration are easy but dirty. Conversely, chemical degradation, i.e., to recover alcohol, carboxylic acid and ester from the alcoholysis reaction or aminolysis reaction, has been believed as an efficient and scientific treatment for PBT waste. However, the tight structure, the high crystallinity and the long natural degradation time (a period up to 16-48 years) of PBT bring much restriction to the realization of chemical degradation recovery.

Therefore, it is of great significance to develop a kind of wool-like polyester filament with the characteristics of easy to dye, low dyeing equipment requirement, low dyeing cost and high recovery efficiency.

SUMMARY

The primary object of the present invention is to provide one kind of wool-like polyester filament with the characteristics of easy to dye, low dyeing equipment requirement, low dyeing cost and high recovery efficiency and preparing method thereof, so as to overcome the wherein said inadequacies in the existed technology.

To this end, the key technical points of the invention are as follows:

The preparing method of the wool-like polyester filament, characterized by manufacturing filament from a modified polyester through a partially orientated yarn (POY) process and successive drawn textured yarn (DTY) processes;

wherein said modified polyester is the product of the esterification and the successive polycondensation reactions of evenly mixed terephthalic acid, 1,4-butanediol, fluorinated dicarboxylic acid, tert-butyl branched hexanediol and 2,5,6,6-tetramethyl-2,5-heptanediol;

wherein said fluorinated dicarboxylic acid could be one of 2,2-difluoro-1,3-malonic acid, 2,2-difluoro-1,4-succinic acid, 2,2-difluoro-1,5-glutaric acid or 2,2,3,3-tetrafluoro-1,4-succinic acid;

wherein said tert-butyl branched hexanediol has a molecular formula as

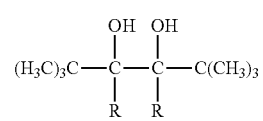

(Formula 1)

with R standing for —H, —CH$_2$CH$_3$ or —C(CH$_3$)$_3$;

wherein said 2,5,6,6-tetramethyl-2,5-heptanediol has a molecular formula as

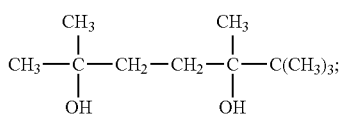

(Formula 2)

wherein said POY process involves the technological parameters of 620-710 m/min for the spinning speed and 110-140° C. for the second heating chamber; in which the spinning speed is a moderate value higher than that for flax-like polyester filament whereas lower than that for viscose-like one; and the temperature of the second heating chamber is also a moderate value lower than that for flax-like polyester filament however higher than that for viscose-like one; therefore the finally obtained wool-like polyester filament possesses a moderate fineness lower than that of flax-like polyester filament but higher than that of viscose-like one and a wool like moderate handle between flax and viscose.

In the present invention the improvement in the dyeing performance of polyester filament is realized by modifying polyester with tert-butyl branched hexanediol and 2,5,6,6-tetramethyl-2,5-heptanediol. The tert-butyl groups imported by tert-butyl branched hexanediol and 2,5,6,6-tetramethyl-2,5-heptanediol, with a more active mobility prior to the polyester main chains, will change the segment movement mode and the segment distance of the polyester main chains so as to enlarge the free volume of polyester, which is favorable to the penetration of dye particles into the polyester, lowering the dyeing temperature, reducing the dyeing time and energy consumption, increasing the dye uptake.

In the present invention the improvement in the natural degradation performance of polyester filament is realized by modifying polyester with fluorinated dicarboxylic acid. The special feature of the fluorinated dicarboxylic acid introduced herein is that the fluorine atom is bonded to α-C. During the hydrolysis process of polyester, the electron cloud density in the C—O bond is reduced by the electron-withdrawing effect of fluorine atom boned to the α-C hence the stability of the tetrahedral anion intermediate formed by ester carbonyl together with nucleophilic attacker will also decrease, which is conducive to the nucleophilic addition reaction. Moreover, the steric hindrance of fluorinated dicarboxylic acid is less than that of terephthalic acid, which further promotes the nucleophilic addition reaction, thus significantly increasing the degradation rate.

In the present invention, the imported tert-butyl branched hexanediol will enlarged the free volume of polyester so as to promote the penetration of water and oxygen necessary to the nucleophilic addition reaction, showing a synergistic effect on accelerating the degradation rate together with the fluorinated dicarboxylic acid.

The following preferred technology program is presented to give a detailed description for this invention.

In the preparing method of the wool-like polyester filament herein, wherein said tert-butyl branched hexanediol is synthesized by means of:

mixing 300-350 g/L of material A solution and 200-300 g/L of dilute sulfuric acid solution in the mole ratio 1.5-2:1 of A to sulfuric acid at first and adding the mixture into a electrolytic cell, then cooling the mixed solution to 10-15° C. and carrying out the electrolytic reduction until the concentration of A decreasing to less 10 wt %, finally obtaining the target compound through a series of processes of cooling crystallization, separation and purification;

with material A corresponding to 2,2-methylpropionaldehyde, 2,2-dimethyl-3-pentanone or 2,2,4,4-tetramethyl-3-pentanone when R (in Formula 1) standing for —H, —CH$_2$CH$_3$ or —C(CH$_3$)$_3$, respectively;

wherein said 2,5,6,6-tetramethyl-2,5-heptanediol is synthesized by means of:

(1) mixing KOH, 3-methyl-3-hydroxybutyne, 3,3-dimethyl-2-butanone and isopropyl ether in the molar ratio of 1-1.2:1:1.2-1.3:2.0-3.0, then carrying out the reaction in an ice bath for 2-4 hr, finally obtaining octyne diol through a series of processes of cooling crystallization, centrifugation, washing, refining and drying;

(2) mixing octyne diol, alcohol and Pd catalyst in the weight ratio of 2-3:10:0.01-0.03, then carrying out the reaction accompanied with a continuous hydrogen input at 40-50° C. for 50-60 min, finally obtaining 2,5,6,6-tetramethyl-2,5-heptanediol through a series of processes of separation and purification;

wherein said modified polyester is prepared by means of:

(1) Esterification concocting terephthalic acid, 1,4-butanediol, fluorinated dicarboxylic acid, tert-butyl branched hexanediol and 2,5,6,6-tetramethyl-2,5-heptanediol into a slurry, then adding in the matting agent and the stabilizer and carrying out the esterification in a nitrogen atmosphere with a pressure 1 KPa less than the absolute pressure at 180-220° C., finally ending the reaction when the water distillation reaching more than 90% of the theoretical value;

(2) Polycondensation adding the catalyst into the esterification products, then smoothly reducing the pressure to less than 500 Pa within 30-50 min and carrying out reaction at 250-260° C. for 30-50 min, successively, further reducing the pressure to less than 100 Pa and continuing the reaction at 265-270° C. for 50-70 min.

In the preparing method of the wool-like polyester filament hereinabove, the molar ratio of terephthalic acid and 1,4-butanediol is 1:1.2-2.0, and being relative to the amount of terephthalic acid, the total addition of the fluorinated dicarboxylic acid, the tert-butyl branched hexanediol and 2,5,6,6-tetramethyl-2,5-heptanediol is 3-5 mol % in a molar ratio of 3-4:1-2:3-4, while the additions of the catalyst, the matting agent and the stabilizer are 0.03-0.05 wt %, 0.20-0.25 wt % and 0.01-0.05 wt %, respectively.

The incorporation of the fluorinated dicarboxylic acid is to promote the degradation rate of polyester while that of the tert-butyl branched hexanediol and 2,5,6,6-tetramethyl-2,5-heptanediol is to enlarge the free volume of polyester so as to favor the penetration of oxygen and water, providing the mutually coordinate effects. Admittedly, the addition amount of the fluorinated dicarboxylic acid, the tert-butyl branched hexanediol and 2,5,6,6-tetramethyl-2,5-heptanediol could be adjusted according to the actual application, however the range should not be too large. If the addition amount is too large, it will affect the properties (mainly mechanical property) in the future application, whereas if the addition amount is too small, it is difficult to significantly improve the dyeing performance or natural degradation performance of the fiber.

In the preparing method of the wool-like polyester filament hereinabove, wherein said catalyst is tetrabutyl titanate, wherein said matting agent is titanium dioxide, and wherein said stabilizer is one of triphenyl phosphate, trimethyl phosphate or trimethyl phosphite;

wherein said modified polyester has a molecular weight of 25000-30000 Da and a molecular weight distribution index of 1.9-2.4;

wherein said POY process includes steps of metering, spinneret extruding, cooling, oiling, and winding;

wherein said POY process involves the technological parameters of 265-275° C. for the spinning temperature, 20-22° C. for the cooling temperature, 2800-3000 m/min for the winding speed;

wherein said DTY process includes steps of filament guiding, hot stretching, false-twisting, heat setting and winding;

wherein said DTY process involves the technological parameters of 3.5-5.5% for the setting over-feed ratio, 2.5-5.0% for the winding over-feed ratio, 200-220° C. for the first heating chamber temperature, 1.4-1.5 for the draw ratio.

Herein said technological parameters of POY and DTY processes should not be considered as the limitations but the feasible schemes.

In the present invention the wool-like polyester filament obtained through the preparing method hereinabove is also provided, which is a type of modified polyester DTY with a monofilament fineness of 2.0-2.7 dtex;

wherein said modified polyester has a molecular chain structure composed of terephthalic acid segments, 1,4-butanediol segments, tert-butyl branched hexanediol segments and 2,5,6,6-tetramethyl-2,5-heptanediol segments.

Prepared through the preferred technology program mentioned above, herein obtained wool-like polyester filament has the following performance indices: monofilament fineness 1.0-3.0 dtex, breaking strength ≥3.0 cN/dtex, breaking strength CV value ≤5.0%, elongation at break 30.0±4.0%, elongation at break CV value ≤8.0%, boiling water shrinkage rate 6.5±0.5%, oil content 2.5±0.5 wt %, interlacing degree 60±10/m, and crimp ratio 40±4.0% (which are close to those of the unmodified common polyester fiber, because the addition amounts of the tert-butyl branched hexanediol, the fluorinated dicarboxylic acid and 2,5,6,6-tetramethyl-2,5-heptanediol herein are so small as not to obviously affect the processability and mechanical performance of the filament);

herein obtained wool-like polyester filament has the following dyeing performance indices: dye uptake 90.32-93.27% (dyed at 100° C.), K/S value 22.15-23.42, color fastness to soaping (polyester staining and cotton staining) level 4, color fastness to dry crocking level 4, and color fastness to wet crocking >level 4 (the corresponding indices measured under the same conditions for the contrast sample made of the unmodified common PBT are listed as follows: dye uptake 89.78%, K/S value 21.31, color fastness to soaping <level 4, i.e., level 3-4 under polyester staining and level 3-4 under cotton staining, color fastness to dry crocking level 4 and color fastness to wet crocking level 3-4, implying herein obtained wool-line polyester can possess a obviously improved dye uptake with lower dyeing temperature, less dyeing time and less energy consumption);

herein obtained wool-like polyester filament has an intrinsic viscosity drop of 17-20% after a storage at 25° C. and R.H. 65% for 60 months (the corresponding drop of the contrast sample is just 5%, implying the incorporation of the tert-butyl branched hexanediol, the fluorinated dicarboxylic acid and 2,5,6,6-tetramethyl-2,5-heptanediol can significantly accelerate the natural degradation rate of PBT fiber).

The mechanism of this invention could be described as follows.

The hydrolysis of polyester in alkaline medium is a nucleophilic addition-elimination process. During the ester hydrolysis, the nucleophilic addition reaction will occur firstly, in which $OH^-$ attacks C atom in ester carbonyl RCOOR' to form a tetrahedral anion intermediate. From this tetrahedral anion, carboxylic acid RCOOH will be formed by eliminating OR' through the broken of ester bond, meanwhile alcohol R'OH can also be obtained from the combination of OR' with $H^+$. However, normally the tetrahedral intermediate has a cramped structure with high steric hindrance, which is detrimental to the nucleophilic addition reaction, hence the ester hydrolysis usually carries on with a rather slow rate.

In the present invention, the polyester hydrolysis is significantly accelerated by importing special structural fluorinated dicarboxylic acid, concretely, dicarboxylic acid containing a $\alpha$-C bonded with fluorine atoms. During the hydrolysis process of polyester, the electron cloud density in the C—O bond is reduced by the electron-withdrawing effect of fluorine atom boned to the $\alpha$-C hence the stability of the tetrahedral anion intermediate will decrease, which is conducive to the nucleophilic addition reaction. Moreover, the steric hindrance of fluorinated dicarboxylic acid is less than that of terephthalic acid, which further promotes the nucleophilic addition reaction, thus significantly increasing the degradation rate. However, the degradation rate of polyester will not be improved significantly if the imported diol contains fluorine atom bonded to $\beta$-C because the electron-withdrawing effect generated by fluorine atom can only pass to adjacent carbon atom but hardly to C—O bond in ester group, hence the attacking of OH— upon carbonyl in nucleophilic addition reaction will not be affected so much.

PBT filament is difficult to recover when used in clothing because of its tight structure and high crystallinity. In the present invention, the fluorinated dicarboxylic acid is imported during the polymerization of PBT, which will promote the nucleophilic addition-elimination in polyester hydrolysis, and will further accelerate the degradation rate of polyester.

Furthermore, the accumulation of macromolecular chains in polymer are not so compact that there still exist some gaps between those chains, which are known as the free volumes. Enough free volumes are necessary for small molecules to diffuse and penetrate into the polymer, and within certain range, the larger the free volume, the better the diffusivity and the higher the permeability. The free volume can be classified by void one and slit one, and the void free volume is more efficient for the penetration of small molecules.

The size and class of free volume are dependent on the polymer structures such as steric hindrance, side group size and side group structure, etc. When a certain site in polymer main chain is substituted by a side group, the mobility of the main chain will be changed, as a result, the interaction force and the distance between polymer chains, as well as the cohesive energy and the free volume of polymer, will vary accordingly. In fact, the polarity, the size and length of side substitution group can draw influences on the rigid, the molecular interaction, and even the free volume of polymer. Therefore, different side groups will lead to different penetration performance.

The backbone conformation of the straight-chain diols, such as ethylene glycol and 1,4-butanediol, is like a zigzag almost lying in a plane. When a H atom of one certain methylene group in the main chain is substituted by a methyl group, the side C atom will locate at one vertex of the tetrahedron formed by the sp3 hybridization of the connected main chain C atom. Meanwhile, the side C atom itself is of sp3 hybridization to form another tetrahedron, therefore, the methyl substitution group cannot lie in the zigzag plane. Furthermore, if the H atoms in methyl group are further substituted by other methyl groups to from a tert-butyl group more such tetrahedrons will be formed. Hence it is easy to understand the tert-butyl substituted polyester will possess a complicated molecular conformation different far from the zigzag to ensure much more void free volumes. However, if a long side chain instead of methyl group is bonded to the polyester backbone, the increase of free volume will be mainly owing to the slit one which is not so sufficient to promote the penetration. Moreover, the long alkyl side chain is easy to cause entanglement because of its flexibility, which is also make against the increase of free volume.

In the present invention, the dyeing performance of PBT filament is improved by introducing the tert-butyl branded hexanediol and 2,5,6,6-tetramethyl-2,5-heptanediol into the PBT molecular chains, wherein the the tert-butyl branded hexanediol has a molecular formula as

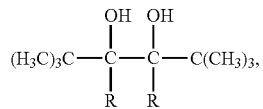

and that for 2,5,6,6-tetramethyl-2,5-heptanediol is

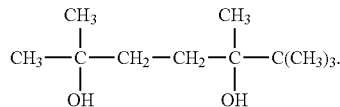

The existence of the tert-butyl branded hexanediol and 2,5,6,6-tetramethyl-2,5-heptanediol in PBT will change the mobility of the main chain of PBT so as to change the interaction force and the distance between PBT molecular chains, finally enlarging the void free volumes of PBT. Compared with short substitution chains such as methyl or ethyl group, the tert-butyl group has a larger space occupation which can gain larger free volume in the molecular aggregate. Whereas compared with long substitution chains, the tert-butyl group will mainly provide the void free volume with larger size than that of the slit free volume which generated mainly by the long side chains, furthermore, the tert-butyl group, with a higher rigidity prior to the long alkyl chains, will seldom cause the entanglement of polymer chains. Disperse dyes, known as the main coloring agent for polyester, are some small molecules without water-soluble groups, and mostly exist in the form of particles with a size ranged from several hundred nanometers to one micron. Therefore, the dyeing with disperse dye is usually of rather slow rate under 100° C., and even in boiled dyeing bath, it is still difficult to gain a high dye uptake. Fortunately, the movement of polyester molecules will be stimulated by the bath temperature, and the side group (affording void free volume) can move earlier and more violently than the main chain (affording slit free volume), hence importing appropriate side groups will be help to the dyeing because the void free volume is more efficient than the slit one for the penetration of dye particles into the fiber. In the present invention, the void free volume of PBT is enlarged by the modification mentioned above, hence the obtained filament could be dyed with higher dye uptake but shorter dyeing time, lower dyeing temperature and less energy consumption.

In the present invention, the incorporated fluorinated dicarboxylic acid, tert-butyl branched hexanediol and 2,5,6,6-tetramethyl-2,5-heptanediol can also show a synergetic effect on the degradation of polyester, because α-C bonded fluorine atom is favorable to the nucleophilic addition involved in the degradation, and the tert-butyl branched hexanediol and 2,5,6,6-tetramethyl-2,5-heptanediol can further promente the degradation by enlarging the void free volume for the penetration of oxygen and water which are necessary for forming the nucleophilic ions.

In conclusion, the present invention provides (1) a method for preparing the wool-like polyester filament, wherein the dyeing performance of the filament is improved by importing the modifier, i.e., the tert-butyl branched hexanediol and 2,5,6,6-tetramethyl-2,5-heptanediol to gain a higher dye uptake with a shorter dyeing time and lower dyeing temperature;

(2) a method for preparing the wool-like polyester filament, wherein the degradation rate of the filament is improved by importing the fluorinated dicarboxylic acid to promote the nucleophilic addition reaction involved in the broken of ester groups;

(3) a method for preparing the wool-like polyester filament with advantages of low cost, easy to operate and appreciable application value;

(4) a type of wool-like polyester filament with good dyeing performance, rapid natural degradation and high mechanical properties.

BRIEF DESCRIPTION OF THE DRAWING

FIGURE is the diagram of equipment for synthesizing the tert-butyl branched hexanediol.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

Example 1

A method for preparing the wool-like polyester filament, comprising the steps:

(1) Preparation of modified polyester (1.1) Synthesizing 2,2,5,5-tetramethyl-3,4-hexanediol (a) mixing 320 g/L of 2,2-methylpropionaldehyde solution and 200 g/L of dilute sulfuric acid solution in the mole ratio 1.5:1 of 2,2-methylpropionaldehyde to sulfuric acid at first, and adding the mixture into a electrolytic cell, then cooling the mixed solution to 12° C. and carrying out the electrolytic reduction until the concentration of 2,2-methyl-propionaldehyde decreasing to 9.5 wt %, finally obtaining the target compound through a series of processes of cooling crystallization, separation and purification, wherein used equipment being shown in FIGURE, and involved chemical reaction equation being as follows,

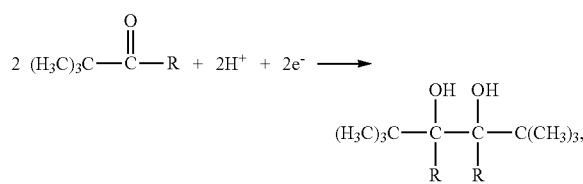

and the molecular formula of obtained 2,2,5,5-tetramethyl-3,4-hexanediol being shown in Formula I

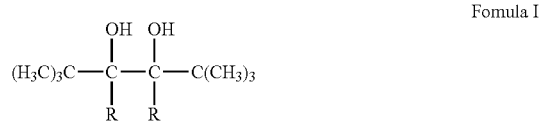

Fomula I with R standing for —H;

(1.2) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1:1:1.2:2.0, then carrying out the reaction in an ice bath for 2 hr, finally obtaining octyne diol through a series of processes of cooling crystallization, centrifugation, washing, refining and drying;

(b) mixing octyne diol, alcohol and Pd catalyst in the weight ratio of 2:10:0.01, then carrying out the reaction accompanied with a continuous hydrogen input at 40° C. for 50 min, finally obtaining 2,5,6,6-tetramethyl-2,5-heptanediol through a series of processes of separation and purification, wherein obtained target compound possessing a molecular structure just as shown in Formula II;

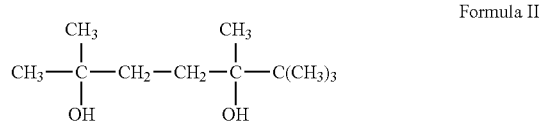

Formula II (1.3) Esterification concocting terephthalic acid, 1,4-butanediol, 2,2-difluoro-1,3-malonic acid, 2,2,5,5-tetramethyl-3,4-hexanediol and 2,5,6,6-tetramethyl-2,5-heptanediol into a slurry, then adding in titanium dioxide and triphenyl phosphate and carrying out the esterification in a nitrogen atmosphere with a pressure 1 KPa less than the absolute pressure at 180° C., finally ending the reaction when the water distillation reaching 90% of the theoretical value, wherein the molar ratio of terephthalic acid and 1,4-butanediol being 1:1.2, and being relative to the amount of terephthalic acid, the total addition of 2,2-difluoro-1,3-malonic acid, 2,2,5,5-tetramethyl-3,4-hexanediol and 2,5,6,6-tetramethyl-2,5-heptanediol being 4 mol % in a molar ratio of 3:1:3.2, while the additions of titanium dioxide and triphenyl phosphate being 0.25 wt % and 0.03 wt %, respectively;

(1.3) Polycondensation adding tetrabutyl titanate into the esterification products, then smoothly reducing the pressure to less than 499 Pa within 30 min and carrying out reaction at 250° C. for 30 min, successively, further reducing the pressure to 99 Pa and continuing the reaction at 265° C. for 50 min, wherein the addition of tetrabutyl titanate being 0.04 wt % according to terephthalic acid, and the obtained modified polyester possessing a molecular weight of 30000 Da and a molecular weight distribution index of 2.0;

(2) Spinning Modified Polyester POY through a technological way including stages of metering, spinneret extruding (at 265° C.), cooling (at 20° C.), oiling, stretching, heat setting and winding (2900 m/min), converting the modified polyester into POY;

(3) Preparing Modified Polyester DTY converting above POY into DTY through a technological way including stages of guiding, hot stretching (in the first heating chamber at 220° C. and with a draw ratio 1.4), false-twisting, heat setting (in the second heating chamber at 110° C. with an over-feed ratio 3.5%) and winding (at 620 m/min with an over-feed ratio 3.5%).

The wool-like polyester filament, i.e., the DTY obtained hereinabove, possesses the mechanical performance indices of monofilament fineness 1.0 dtex, breaking strength 3.3 cN/dtex, breaking strength CV value 4.8%, elongation at break 30.0%, elongation at break CV value 7.0%, boiling water shrinkage rate 4.0%, oil content 2.0 wt %, interlacing degree 55/m, and crimp ratio 40.0%;

The dyeing process of the wool-like polyester filament obtained hereinabove is described as follows: throwing the filament into a dyeing bath of 2% (o.w.f) of Disperse Red 3B, then heating the bath to 55° C. and holding for 10 min, further increasing the temperature to 100° C. in a rate of 0.8° C./min and holding for 60 min again, finally cooling the bathe to 50° C. and carry out the reductive cleaning for 20 min;

wherein the dye uptake measurement being as follows: drawing 2 mL of the pre-dyeing bathe and the residual bath into two 10 mL volumetric flasks respectively, and for each one, adding in 4 mL acetone to fully dissolve the dye and diluting the solution to 10 mL with distilled water, then measure the absorbance of the diluted solution with a spectrophotometer, finally calculating dye uptake (%)=$(1-A_1)/A_0 \times 100\%$ with $A_0$ standing for the absorbance of the pre-dyeing solution, $A_1$ for the residual one;

wherein the color fastness being tested according to the standards of GB3920-83, GB251-64 and GB3921-83, while the K/S value being directly measured with a SF600X DATACOLOR colorimeter during which the tests being performed 5 times within different wavelength bands and being averaged.

The dyeing performance indices obtained hereinabove of the wool like polyester filament are as following: dye uptake 90.32%, K/S value 22.15, color fastness to soaping level 4, color fastness to dry crocking level 4, and color fastness to wet crocking level 5.

The wool-like polyester filament obtained hereinabove shows an intrinsic viscosity drop by 26% when stored at 25° C. and R.H. 65% for 60 months.

Comparison 1

A method for preparing the wool-like polyester filament involved steps basically the same as those in Example 1, except for no modification for polyester, i.e., there is no 2,2-difluoro-1,3-malonic acid, 2,2,5,5-tetramethyl-3,4-hexanediol and 2,5,6,6-tetramethyl-2,5-heptanediol in step (1), from which the finally obtained wool-like polyester filament possesses the mechanical performance indices of monofilament fineness 1.0 dtex, breaking strength 3.2 cN/dtex, breaking strength CV value 4.7%, elongation at break 32%, elongation at break CV value 7.0%, boiling water shrinkage rate 4.2%, oil content 2.0 wt %, interlacing degree 55/m, and crimp ratio 40.0%;

the dyeing performance indices of dye uptake 89.78% (dye at 100° C.), K/S value 21.31, color fastness to soaping less than level 4 (level 3-4 under polyester staining while level 3-4 under cotton staining), color fastness to dry crocking level 4, and color fastness to wet crocking level 3-4;

and an intrinsic viscosity drop by 4.8% when stored at 25° C. and R.H. 65% for 60 months.

The comparison shows that the modification herein by means of 2,2-difluoro-1,3-malonic acid, 2,2,5,5-tetramethyl-3,4-hexanediol and 2,5,6,6-tetramethyl-2,5-heptanediol will significantly improve the dyeing and natural degradation performance of polyester fiber without loss of mechanical properties.

Comparison 2

A method for preparing the wool-line polyester filament involved steps basically the same as those in Example 1, except for using 3,3-difluoroglutaric acid instead of 2,2-difluoro-1,3-malonic acid in step (1), from which the finally obtained wool-like polyester filament possesses the mechanical performance indices of monofilament fineness 1.0 dtex, breaking strength 3.2 cN/dtex, breaking strength CV value 4.6%, elongation at break 32%, elongation at break CV value 7.0%, boiling water shrinkage rate 4.2%, oil content 2.0 wt %, interlacing degree 55/m, and crimp ratio 40.0%;

and an intrinsic viscosity drop by 4.9% when stored at 25° C. and R.H. 65% for 60 months.

The comparison shows that compared with α-C bonded fluorine atom, β-C bonded fluorine atom in the modified polyester can only make rather weak effect upon the natural degradation of the obtained polyester fiber, because its electron-withdrawing effect just pass to the neighbor atoms of β-C so as to give little influence on the nucleophilic addition reaction of ester carbonyl when attacked by $OH^-$.

Comparison 3

A method for preparing the wool-like polyester filament involved steps basically the same as those in Example 1, except for using 1,2-dodecyl glycol instead of 2,2,5,5-tetramethyl-3,4-hexanediol and 2,5,6,6-tetramethyl-2,5-heptanediol in step (1), from which the finally obtained wool-like polyester filament possesses the mechanical performance indices of monofilament fineness 1.0 dtex, breaking strength 3.2 cN/dtex, breaking strength CV value 4.7%, elongation at break 31%, elongation at break CV value 7.0%, boiling water shrinkage rate 4.0%, oil content 2.0 wt %, interlacing degree 55/m, and crimp ratio 40.0%;

and the dyeing performance indices of dye uptake 89.98% (at 100° C.), K/S value 21.57, color fastness to soaping level 4-5, color fastness to dry crocking less than level 4 (level 3-4 under polyester staining while level 3-4 under cotton staining), and color fastness to wet crocking level 3-4.

The comparison shows that 2,2,5,5-tetramethyl-3,4-hexanediol and 2,5,6,6-tetramethyl-2,5-heptanediol are more efficient than 1,2-dodecyl glycol on improving the dyeing performances of the wool-like polyester filament, and the reason on one hand is that the short side chain can enlarge the void free volume whereas the long side can mainly enlarge the slit free volume, and the void free volume is more efficient than the slit one for the penetration of dye particles into the fiber, on the other hand, the short side chain with higher rigidity will seldom cause the molecular chain entanglement and gain more free volume in the molecular aggregate.

Example 2

A method for preparing the wool-like polyester filament, comprising the steps:

(1) Preparation of Modified Polyester (1.1) Synthesizing 2,2,5,5-tetramethyl-3,4-diethyl-3,4-hexanediol (a) mixing 350 g/L of 2,2-dimethyl-3-pentanone solution and 210 g/L of dilute sulfuric acid solution in the mole ratio 1.6:1 of 2,2-dimethyl-3-pentanone to sulfuric acid at first, and adding the mixture into a electrolytic cell, then cooling the mixed solution to 11° C. and carrying out the electrolytic reduction until the concentration of 2,2-dimethyl-3-pentanone decreasing to 9.0 wt %, finally obtaining the target compound through a series of processes of cooling crystallization, separation and purification, wherein used equipment and involved chemical reaction equation being the same as those in Example 1, and the molecular formula of obtained 2,2,5,5-tetramethyl-3,4-diethyl-3,4-hexanediol being shown in Formula I with R standing for $-CH_2CH_3$;

(1.2) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1.1:1:1.2:2.3, then carrying out the reaction in an ice bath for 2 hr, finally obtaining octyne diol through a series of processes of cooling crystallization, centrifugation, washing, refining and drying;

(b) mixing octyne diol, alcohol and Pd catalyst in the weight ratio of 2:10:0.01, then carrying out the reaction accompanied with a continuous hydrogen input at 45° C. for 50 min, finally obtaining 2,5,6,6-tetramethyl-2,5-heptanediol through a series of processes of separation and purification, wherein obtained target compound possessing a molecular structure just as shown in Formula II;

(1.3) Esterification concocting terephthalic acid, 1,4-butanediol, 2,2-difluoro-1,4-succinic acid, 2,2,5,5-tetramethyl-3,4-diethyl-3,4-hexanediol and 2,5,6,6-tetramethyl-2,5-heptanediol into a slurry, then adding in titanium dioxide and trimethyl phosphate and carrying out the esterification in a nitrogen atmosphere with a pressure 1 KPa less than the absolute pressure at 180° C., finally ending the reaction when the water distillation reaching 91% of the theoretical value, wherein the molar ratio of terephthalic acid and 1,4-butanediol being 1:2.0, and being relative to the amount of terephthalic acid, the total addition of 2,2-difluoro-1,4-succinic acid, 2,2,5,5-tetramethyl-3,4-diethyl-3,4-hexanediol and 2,5,6,6-tetramethyl-2,5-heptanediol being 3 mol % in a molar ratio of 3:2:3, while the additions of titanium dioxide and trimethyl phosphate being 0.23 wt % and 0.02 wt %, respectively;

(1.3) Polycondensation adding tetrabutyl titanate into the esterification products, then smoothly reducing the pressure to less than 450 Pa within 50 min and carrying out reaction at 260° C. for 50 min, successively, further reducing the pressure to 90 Pa and continuing the reaction at 265° C. for 70 min, wherein the addition of tetrabutyl titanate being 0.03 wt % according to terephthalic acid, and the obtained modified polyester possessing a molecular weight of 28000 Da and a molecular weight distribution index of 2.2;

(2) Spinning Modified Polyester POY through a technological way including stages of metering, spinneret extruding (at 265° C.), cooling (at 22° C.), oiling, stretching, heat setting and winding (2800 m/min), converting the modified polyester into POY;

(3) Preparing Modified Polyester DTY converting above POY into DTY through a technological way including stages of guiding, hot stretching (in the first heating chamber at 215° C. and with a draw ratio 1.5), false-twisting, heat setting (in the second heating chamber at 120° C. with an over-feed ratio 5.5%) and winding (at 620 m/min with an over-feed ratio 2.5%).

The wool-like polyester filament, i.e., the DTY obtained hereinabove, possesses the mechanical performance indices of monofilament fineness 1.5 dtex, breaking strength 3.2 cN/dtex, breaking strength CV value 4.6%, elongation at break 32%, elongation at break CV value 7.5%, boiling water shrinkage rate 4.5%, oil content 2.0 wt %, interlacing degree 70/m, and crimp ratio 44.0%;

The dyeing process of the wool-like polyester filament obtained hereinabove is carried out under the conditions just the same as Example 1, and the dyeing performance indices are as following: dye uptake 90.32%, K/S value 23.42, color fastness to soaping level 4, color fastness to dry crocking level 4, and color fastness to wet crocking level 5.

The wool-like polyester filament obtained hereinabove shows an intrinsic viscosity drop by 19% when stored at 25° C. and R.H. 65% for 60 months.

Example 3

A method for preparing the wool-like polyester filament, comprising the steps:

(1) Preparation of Modified Polyester (1.1) Synthesizing 2,2,4,4-tetramethyl-3,4-di-tert-butyl-3,4-hexanediol (a) mixing 340 g/L of 2,2,4,4-tetramethyl-3-pentanone solution and 230 g/L of dilute sulfuric acid solution in the mole ratio 1.7:1 of 2,2,4,4-tetramethyl-3-pentanone to sulfuric acid at first, and adding the mixture into a electrolytic cell, then cooling the mixed solution to 10° C. and carrying out the electrolytic reduction until the concentration of 2,2,4,4-tetramethyl-3-pentanone decreasing to 9.6 wt %, finally obtaining the target compound through a series of processes of cooling crystallization, separation and purification, wherein used equipment and involved chemical reaction equation being the same as those in Example 1, and the molecular formula of obtained 2,2,4,4-tetramethyl-3,4-di-tert-butyl-3,4-hexanediol being shown in Formula I with R standing for —$CH(CH_3)_3$;

(1.2) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1.2:1:1.25:2.0, then carrying out the reaction in an ice bath for 2 hr, finally obtaining octyne diol through a series of processes of cooling crystallization, centrifugation, washing, refining and drying;

(b) mixing octyne diol, alcohol and Pd catalyst in the weight ratio of 3:10:0.03, then carrying out the reaction accompanied with a continuous hydrogen input at 40° C. for 50 min, finally obtaining 2,5,6,6-tetramethyl-2,5-heptanediol through a series of processes of separation and purification, wherein obtained target compound possessing a molecular structure just as shown in Formula II;

(1.3) Esterification concocting terephthalic acid, 1,4-butanediol, 2,2-difluoro-1,5-glutaric acid, 2,2,4,4-tetramethyl-3,4-di-tert-butyl-3,4-hexanediol and 2,5,6,6-tetramethyl-2,5-heptanediol into a slurry, then adding in titanium dioxide and trimethyl phosphite and carrying out the esterification in a nitrogen atmosphere with a pressure 1 KPa less than the absolute pressure at 190° C., finally ending the reaction when the water distillation reaching 93% of the theoretical value, wherein the molar ratio of terephthalic acid and 1,4-butanediol being 1:1.2, and being relative to the amount of terephthalic acid, the total addition of 2,2-difluoro-1,5-glutaric acid, 2,2,4,4-tetramethyl-3,4-di-tert-butyl-3,4-hexanediol and 2,5,6,6-tetramethyl-2,5-heptanediol being 3 mol % in a molar ratio of 3.4:1:3, while the additions of titanium dioxide and triphenyl phosphite being 0.20 wt % and 0.05 wt %, respectively;

(1.3) Polycondensation adding tetrabutyl titanate into the esterification products, then smoothly reducing the pressure to less than 480 Pa within 40 min and carrying out reaction at 255° C. for 40 min, successively, further reducing the pressure to 95 Pa and continuing the reaction at 268° C. for 50 min, wherein the addition of tetrabutyl titanate being 0.03 wt % according to terephthalic acid, and the obtained modified polyester possessing a molecular weight of 25000 Da and a molecular weight distribution index of 2.4;

(2) Spinning Modified Polyester POY through a technological way including stages of metering, spinneret extruding (at 267° C.), cooling (at 20° C.), oiling, stretching, heat setting and winding (2800 m/min), converting the modified polyester into POY;

(3) Preparing Modified Polyester DTY converting above POY into DTY through a technological way including stages of guiding, hot stretching (in the first heating chamber at 200° C. and with a draw ratio 1.43), false-twisting, heat setting (in the second heating chamber at 120° C. with an over-feed ratio 3.5%) and winding (at 620 m/min with an over-feed ratio 2.5%).

The wool-like polyester filament, i.e., the DTY obtained hereinabove, possesses the mechanical performance indices of monofilament fineness 1.8 dtex, breaking strength 3.0 cN/dtex, breaking strength CV value 4.1%, elongation at break 27%, elongation at break CV value 8.0%, boiling water shrinkage rate 5.0%, oil content 3.0 wt %, interlacing degree 60/m, and crimp ratio 36.0%;

The dyeing process of the wool-like polyester filament obtained hereinabove is carried out under the conditions just the same as Example 1, and the dyeing performance indices are as following: dye uptake 92.56%, K/S value 23.42, color fastness to soaping level 4, color fastness to dry crocking level 4, and color fastness to wet crocking level 5.

The wool-like polyester filament obtained hereinabove shows an intrinsic viscosity drop by 20% when stored at 25° C. and R.H. 65% for 60 months.

Example 4

A method for preparing the wool-like polyester filament, comprising the steps:

(1) Preparation of Modified Polyester (1.1) Synthesizing 2,2,5,5-tetramethyl-3,4-hexanediol (a) mixing 300 g/L of 2,2-methylpropionaldehyde solution and 250 g/L of dilute sulfuric acid solution in the mole ratio 1.8:1 of 2,2-methylpropionaldehyde to sulfuric acid at first, and adding the mixture into a electrolytic cell, then cooling the mixed solution to 15° C. and carrying out the electrolytic reduction until the concentration of 2,2-methylpropionaldehyde decreasing to 9.3 wt %, finally obtaining the target compound through a series of processes of cooling crystallization, separation and purification, wherein used equipment and involved chemical reaction equation being the same as those in Example 1, and the molecular formula of obtained 2,2,5,5-tetramethyl-3,4-hexanediol being shown in Formula I with R standing for —H;

(1.2) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1.2:1:1.3:2.5, then carrying out the reaction in an ice bath for 3 hr, finally obtaining octyne diol through a series of processes of cooling crystallization, centrifugation, washing, refining and drying;

(b) mixing octyne diol, alcohol and Pd catalyst in the weight ratio of 2.5:10:0.02, then carrying out the reaction accompanied with a continuous hydrogen input at 45° C. for 60 min, finally obtaining 2,5,6,6-tetramethyl-2,5-heptanediol through a series of processes of separation and purification, wherein obtained target compound possessing a molecular structure just as shown in Formula II;

(1.3) Esterification concocting terephthalic acid, 1,4-butanediol, 2,2,3,3-tetrafluoro-1,4-succinic acid, 2,2,5,5-tetramethyl-3,4-hexanediol and 2,5,6,6-tetramethyl-2,5-heptanediol into a slurry, then adding in titanium dioxide and trimethyl phosphite and carrying out the esterification in a nitrogen atmosphere with a pressure 1 KPa less than the absolute pressure at 190° C., finally ending the reaction when the water distillation reaching 93% of the theoretical value, wherein the molar ratio of terephthalic acid and 1,4-butanediol being 1:1.5, and being relative to the amount of terephthalic acid, the total addition of 2,2,3,3-tetrafluoro-1,4-succinic acid, 2,2,5,5-tetramethyl-3,4-hexanediol and 2,5,6,6-tetramethyl-2,5-heptanediol being 5 mol % in a molar ratio of 3.8:1.6:4, while the additions of titanium dioxide and trimethyl phosphite being 0.20 wt % and 0.01 wt %, respectively;

(1.3) Polycondensation adding tetrabutyl titanate into the esterification products, then smoothly reducing the pressure to less than 480 Pa within 35 min and carrying out reaction at 258° C. for 45 min, successively, further reducing the pressure to 96 Pa and continuing the reaction at 266° C. for 65 min, wherein the addition of tetrabutyl titanate being 0.05 wt % according to terephthalic acid, and the obtained modified polyester possessing a molecular weight of 25000 Da and a molecular weight distribution index of 1.9;

(2) Spinning Modified Polyester POY through a technological way including stages of metering, spinneret extruding (at 268° C.), cooling (at 21° C.), oiling, stretching, heat setting and winding (3000 m/min), converting the modified polyester into POY;

(3) Preparing Modified Polyester DTY converting above POY into DTY through a technological way including stages of guiding, hot stretching (in the first heating chamber at 200° C. and with a draw ratio 1.48), false-twisting, heat setting (in the second heating chamber at 110° C. with an over-feed ratio 4.5%) and winding (at 650 m/min with an over-feed ratio 5.0%).

The wool-like polyester filament, i.e., the DTY obtained hereinabove, possesses the mechanical performance indices of monofilament fineness 2.5 dtex, breaking strength 3.0 cN/dtex, breaking strength CV value 4.8%, elongation at break 29%, elongation at break CV value 7.9%, boiling water shrinkage rate 5.5%, oil content 2.5 wt %, interlacing degree 55/m, and crimp ratio 41.0%;

The dyeing process of the wool-like polyester filament obtained hereinabove is carried out under the conditions just the same as Example 1, and the dyeing performance indices are as following: dye uptake 91.85%, K/S value 22.15, color fastness to soaping level 4, color fastness to dry crocking level 4, and color fastness to wet crocking level 6.

The wool-like polyester filament obtained hereinabove shows an intrinsic viscosity drop by 20% when stored at 25° C. and R.H. 65% for 60 months.

Example 5

A method for preparing the wool-like polyester filament, comprising the steps:

(1) Preparation of Modified Polyester (1.1) Synthesizing 2,2,5,5-tetramethyl-3,4-diethyl-3,4-hexanediol (a) mixing 310 g/L of 2,2-dimethyl-3-pentanone solution and 300 g/L of dilute sulfuric acid solution in the mole ratio 1.9:1 of 2,2-dimethyl-3-pentanone to sulfuric acid at first, and adding the mixture into a electrolytic cell, then cooling the mixed solution to 15° C. and carrying out the electrolytic reduction until the concentration of 2,2-dimethyl-3-pentanone decreasing to 8.8 wt %, finally obtaining the target compound through a series of processes of cooling crystallization, separation and purification, wherein used equipment and involved chemical reaction equation being the same as those in Example 1, and the molecular formula of obtained 2,2,5,5-tetramethyl-3,4-diethyl-3,4-hexanediol being shown in Formula I with R standing for —CH$_2$CH$_3$;

(1.2) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1:1:1.3:3.0, then carrying out the reaction in an ice bath for 4 hr, finally obtaining octyne diol through a series of processes of cooling crystallization, centrifugation, washing, refining and drying;

(b) mixing octyne diol, alcohol and Pd catalyst in the weight ratio of 2.5:10:0.02, then carrying out the reaction accompanied with a continuous hydrogen input at 50° C. for 55 min, finally obtaining 2,5,6,6-tetramethyl-2,5-heptanediol through a series of processes of separation and purification, wherein obtained target compound possessing a molecular structure just as shown in Formula II;

(1.3) Esterification concocting terephthalic acid, 1,4-butanediol, 2,2-difluoro-1,3-malonic acid, 2,2,5,5-tetramethyl-3,4-diethyl-3,4-hexanediol and 2,5,6,6-tetramethyl-2,5-heptanediol into a slurry, then adding in titanium dioxide and triphenyl phosphate and carrying out the esterification in a nitrogen atmosphere with a pressure 1 KPa less than the absolute pressure at 220° C., finally ending the reaction when the water distillation reaching 93% of the theoretical value, wherein the molar ratio of terephthalic acid and 1,4-butanediol being 1:1.8, and being relative to the amount of terephthalic acid, the total addition of 2,2-difluoro-1,3-malonic acid, 2,2,5,5-tetramethyl-3,4-diethyl-3,4-hexanediol and 2,5,6,6-tetramethyl-2,5-heptanediol being 4 mol % in a molar ratio of 4:1.2:3.5, while the additions of titanium dioxide and triphenyl phosphate being 0.25 wt % and 0.01 wt %, respectively;

(1.3) Polycondensation adding tetrabutyl titanate into the esterification products, then smoothly reducing the pressure to less than 480 Pa within 50 min and carrying out reaction at 255° C. for 50 min, successively, further reducing the pressure to 95 Pa and continuing the reaction at 270° C. for 55 min, wherein the addition of tetrabutyl titanate being 0.04 wt % according to terephthalic acid, and the obtained modified polyester possessing a molecular weight of 30000 Da and a molecular weight distribution index of 1.9;

(2) Spinning Modified Polyester POY through a technological way including stages of metering, spinneret extruding (at 275° C.), cooling (at 21° C.), oiling, stretching, heat setting and winding (2850 m/min), converting the modified polyester into POY;

(3) Preparing Modified Polyester DTY converting above POY into DTY through a technological way including stages of guiding, hot stretching (in the first heating chamber at 220° C. and with a draw ratio 1.4), false-twisting, heat setting (in the second heating chamber at 120° C. with an over-feed ratio 4.5%) and winding (at 650 m/min with an over-feed ratio 4.0%).

The wool-like polyester filament, i.e., the DTY obtained hereinabove, possesses the mechanical performance indices of monofilament fineness 3.0 dtex, breaking strength 3.2 cN/dtex, breaking strength CV value 5.0%, elongation at break 26%, elongation at break CV value 7.2%, boiling water shrinkage rate 6.0%, oil content 2.5 wt %, interlacing degree 65/m, and crimp ratio 40.0%;

The dyeing process of the wool-like polyester filament obtained hereinabove is carried out under the conditions just the same as Example 1, and the dyeing performance indices are as following: dye uptake 93.27%, K/S value 23.05, color fastness to soaping level 4, color fastness to dry crocking level 4, and color fastness to wet crocking level 6.

The wool-like polyester filament obtained hereinabove shows an intrinsic viscosity drop by 17% when stored at 25° C. and R.H. 65% for 60 months.

Example 6

A method for preparing the wool-like polyester filament, comprising the steps:

(1) Preparation of Modified Polyester (1.1) Synthesizing 2,2,4,4-tetramethyl-3,4-di-tert-butyl-3,4-hexanediol (a) mixing 350 g/L of 2,2,4,4-tetramethyl-3-pentanone solution and 220 g/L of dilute sulfuric acid solution in the mole ratio 2:1 of 2,2,4,4-tetramethyl-3-pentanone to sulfuric acid at first, and adding the mixture into a electrolytic cell, then cooling the mixed solution to 13° C. and carrying out the electrolytic reduction until the concentration of 2,2,4,4-tetramethyl-3-pentanone decreasing to 9.6 wt %, finally obtaining the target compound through a series of processes of cooling crystallization, separation and purification, wherein used equipment and involved chemical reaction equation being the same as those in Example 1, and the molecular formula of obtained 2,2,4,4-tetramethyl-3,4-di-tert-butyl-3,4-hexanediol being shown in Formula I with R standing for —CH(CH$_3$)$_3$;

(1.2) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1.1:1:1.2:3.0, then carrying out the reaction in an ice bath for 4 hr, finally obtaining octyne diol through a series of processes of cooling crystallization, centrifugation, washing, refining and drying;

(b) mixing octyne diol, alcohol and Pd catalyst in the weight ratio of 3:10:0.03, then carrying out the reaction accompanied with a continuous hydrogen input at 50° C. for 60 min, finally obtaining 2,5,6,6-tetramethyl-2,5-heptanediol through a series of processes of separation and purification, wherein obtained target compound possessing a molecular structure just as shown in Formula II;

(1.3) Esterification concocting terephthalic acid, 1,4-butanediol, 2,2-difluoro-1,4-succinic acid, 2,2,4,4-tetramethyl-3,4-di-tert-butyl-3,4-hexanediol and 2,5,6,6-tetramethyl-2,5-heptanediol into a slurry, then adding in titanium dioxide and trimethyl phosphate and carrying out the esterification in a nitrogen atmosphere with a pressure 1 KPa less than the absolute pressure at 220° C., finally ending the reaction when the water distillation reaching 90% of the theoretical value, wherein the molar ratio of terephthalic acid and 1,4-butanediol being 1:2.0, and being relative to the amount of terephthalic acid, the total addition of 2,2-difluoro-1,4-succinic acid, 2,2,4,4-tetramethyl-3,4-di-tert-butyl-3,4-hexanediol and 2,5,6,6-tetramethyl-2,5-heptanediol being 5 mol % in a molar ratio of 4:2:4, while the additions of titanium dioxide and triphenyl phosphate being 0.21 wt % and 0.01 wt %, respectively;

(1.3) Polycondensation adding tetrabutyl titanate into the esterification products, then smoothly reducing the pressure to less than 450 Pa within 30 min and carrying out reaction at 260° C. for 30 min, successively, further reducing the pressure to 92 Pa and continuing the reaction at 270° C. for 70 min, wherein the addition of tetrabutyl titanate being 0.05 wt % according to terephthalic acid, and the obtained modified polyester possessing a molecular weight of 28000 Da and a molecular weight distribution index of 1.9;

(2) Spinning Modified Polyester POY through a technological way including stages of metering, spinneret extruding (at 275° C.), cooling (at 22° C.), oiling, stretching, heat setting and winding (3000 m/min), converting the modified polyester into POY;

(3) Preparing Modified Polyester DTY converting above POY into DTY through a technological way including stages of guiding, hot stretching (in the first heating chamber at 215° C. and with a draw ratio 1.4), false-twisting, heat setting (in the second heating chamber at 140° C. with an over-feed ratio 5.5%) and winding (at 710 m/min with an over-feed ratio 5.0%).

The wool-like polyester filament, i.e., the DTY obtained hereinabove, possesses the mechanical performance indices of monofilament fineness 2.4 dtex, breaking strength 3.1 cN/dtex, breaking strength CV value 5.0%, elongation at break 28%, elongation at break CV value 7.5%, boiling water shrinkage rate 5.0%, oil content 3.0 wt %, interlacing degree 70/m, and crimp ratio 36.0%;

The dyeing process of the wool-like polyester filament obtained hereinabove is carried out under the conditions just the same as Example 1, and the dyeing performance indices are as following: dye uptake 93.27%, K/S value 23.42, color fastness to soaping level 4, color fastness to dry crocking level 4, and color fastness to wet crocking level 5.

The wool-like polyester filament obtained hereinabove shows an intrinsic viscosity drop by 19% when stored at 25° C. and R.H. 65% for 60 months.

Example 7

A method for preparing the wool-like polyester filament, comprising the steps:

(1) Preparation of Modified Polyester (1.1) Synthesizing 2,2,5,5-tetramethyl-3,4-hexanediol (a) mixing 340 g/L of 2,2-methylpropionaldehyde solution and 260 g/L of dilute sulfuric acid solution in the mole ratio 1.5:1 of 2,2-methylpropionaldehyde to sulfuric acid at first, and adding the mixture into a electrolytic cell, then cooling the mixed solution to 13° C. and carrying out the electrolytic reduction until the concentration of 2,2-methylpropionaldehyde decreasing to 9.5 wt %, finally obtaining the target compound through a series of processes of cooling crystallization, separation and purification, wherein used equipment and involved chemical reaction equation being the same as those in Example 1, and the molecular formula of obtained 2,2,5,5-tetramethyl-3,4-hexanediol being shown in Formula I with R standing for —H;

(1.2) Synthesizing 2,5,6,6-tetramethyl-2,5-heptanediol (a) mixing KOH, 3-methyl-3-hydroxybutyne, 3,3-dimethyl-2-butanone and isopropyl ether in the molar ratio of 1.2:1:1.2:3.0, then carrying out the reaction in an ice bath for 3 hr, finally obtaining octyne diol through a series of processes of cooling crystallization, centrifugation, washing, refining and drying;

(b) mixing octyne diol, alcohol and Pd catalyst in the weight ratio of 3:10:0.02, then carrying out the reaction accompanied with a continuous hydrogen input at 42° C. for 55 min, finally obtaining 2,5,6,6-tetramethyl-2,5-heptanediol through a series of processes of separation and purification, wherein obtained target compound possessing a molecular structure just as shown in Formula II;

(1.3) Esterification concocting terephthalic acid, 1,4-butanediol, 2,2-difluoro-1,5-glutaric acid, 2,2,5,5-tetramethyl-3,4-hexanediol and 2,5,6,6-tetramethyl-2,5-heptanediol into a slurry, then adding in titanium dioxide and trimethyl phosphite and carrying out the esterification in a nitrogen atmosphere with a pressure 1 KPa less than the absolute pressure at 220° C., finally ending the reaction when the water distillation reaching 93% of the theoretical value, wherein the molar ratio of terephthalic acid and 1,4-butanediol being 1:1.9, and being relative to the amount of terephthalic acid, the total addition of 2,2-difluoro-1,5-glutaric acid, 2,2,5,5-tetramethyl-3,4-hexanediol and 2,5,6,6-tetramethyl-2,5-heptanediol being 4 mol % in a molar ratio of 3.6:1:3.8, while the additions of titanium dioxide and trimethyl phosphite being 0.25 wt % and 0.05 wt %, respectively;

(1.3) Polycondensation adding tetrabutyl titanate into the esterification products, then smoothly reducing the pressure to less than 490 Pa within 50 min and carrying out reaction at 255° C. for 50 min, successively, further reducing the pressure to 95 Pa and continuing the reaction at 268° C. for 50 min, wherein the addition of tetrabutyl titanate being 0.035 wt % according to terephthalic acid, and the obtained modified polyester possessing a molecular weight of 30000 Da and a molecular weight distribution index of 2.4;

(2) Spinning Modified Polyester POY through a technological way including stages of metering, spinneret extruding (at 272° C.), cooling (at 20° C.), oiling, stretching, heat setting and winding (2900 m/min), converting the modified polyester into POY;

(3) Preparing Modified Polyester DTY converting above POY into DTY through a technological way including stages of guiding, hot stretching (in the first heating chamber at 220° C. and with a draw ratio 1.5), false-twisting, heat setting (in the second heating chamber at 140° C. with an over-feed ratio 3.5%) and winding (at 710 m/min with an over-feed ratio 3.5%).

The wool-like polyester filament, i.e., the DTY obtained hereinabove, possesses the mechanical performance indices of monofilament fineness 2.0 dtex, breaking strength 3.1 cN/dtex, breaking strength CV value 4.5%, elongation at break 26%, elongation at break CV value 8.0%, boiling water shrinkage rate 5.0%, oil content 2.5 wt %, interlacing degree 50/m, and crimp ratio 44.0%;

The dyeing process of the wool-like polyester filament obtained hereinabove is carried out under the conditions just the same as Example 1, and the dyeing performance indices are as following: dye uptake 92.55%, K/S value 22.15, color fastness to soaping level 4, color fastness to dry crocking level 4, and color fastness to wet crocking level 5.

The wool-like polyester filament obtained hereinabove shows an intrinsic viscosity drop by 18% when stored at 25° C. and R.H. 65% for 60 months.

What is claimed is:

1. A preparing method for a wool-like polyester filament, characterized by manufacturing filament from a modified polyester through a partially orientated yarn (POY) process and successive drawn textured yarn (DTY) processes;

wherein the modified polyester is a product of an esterification and successive polycondensation reactions of an evenly mixed mixture of terephthalic acid, 1,4-butanediol, a fluorinated dicarboxylic acid, a tert-butyl branched hexanediol and 2,5,6,6-tetramethyl-2,5-heptanediol;

wherein the fluorinated dicarboxylic acid is selected from the group consisting of 2,2-difluoro-1,3-malonic acid, 2,2-difluoro-1,4-succinic acid, 2,2-difluoro-1,5-glutaric acid and 2,2,3,3-tetrafluoro-1,4-succinic acid;

wherein the tert-butyl branched hexanediol has a molecular formula of

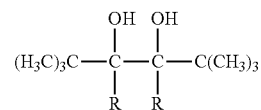

(Formula 1)

with R standing for —H, —CH$_2$CH$_3$ or —C(CH$_3$)$_3$;

wherein the 2,5,6,6-tetramethyl-2,5-heptanediol has a molecular formula of

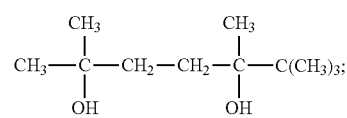

(Formula 2)

wherein the DTY processes involve a first heating chamber temperature and a second heating chamber temperature, and the DTY processes involve technical parameters of 620-710 m/min for a spinning speed and 110-140° C. for the second heating chamber temperature.

2. The preparing method of claim 1, wherein the tert-butyl branched hexanediol is synthesized by means of:

mixing a 300-350 g/L solution of material A and a 200-300 g/L solution of dilute sulfuric acid at a molar ratio of (1.5-2):1 of the material A to the sulfuric acid to form a mixed solution, and adding the mixed solution into an electrolytic cell, then cooling the mixed solution to 10-15° C. and carrying out an electrolytic reduction until a concentration of the material A decreases to less 10 wt %, and finally obtaining the tert-butyl branched hexanediol through a series of processes of cooling crystallization, separation and purification;

wherein the material A is 2,2-methylpropionaldehyde, 2,2-dimethyl-3-pentanone or 2,2,4,4-tetramethyl-3-pentanone when R in Formula 1 stands for —H, —CH$_2$CH$_3$ or —C(CH$_3$)$_3$, respectively;

wherein the 2,5,6,6-tetramethyl-2,5-heptanediol is synthesized by means of:

(1) mixing KOH, 3-methyl-3-hydroxybutyne, 3,3-dimethyl-2-butanone and isopropyl ether in a molar ratio of (1-1.2):1:(1.2-1.3):(2.0-3.0), then carrying out the reaction in an ice bath for 2-4 hrs, finally obtaining octyne diol through a series of processes of cooling crystallization, centrifugation, washing, refining and drying, (2) mixing the octyne diol, an alcohol and a Pd catalyst in a weight ratio of (2-3):10:(0.01-0.03), then carrying out the reaction with a continuous hydrogen input at 40-50° C. for 50-60 min, finally obtaining the 2,5,6,6-tetramethyl-2,5-heptanediol through a series of processes of separation and purification.

3. The preparing method of claim 2, wherein the modified polyester is prepared by means of:

(1) Esterification concocting the terephthalic acid, the 1,4-butanediol, the fluorinated dicarboxylic acid, the tert-butyl branched hexanediol and the 2,5,6,6-tetramethyl-2,5-heptanediol into a slurry, then adding in a matting agent and a stabilizer and carrying out the esterification in a nitrogen atmosphere with a pressure 1 KPa less than an absolute pressure at 180-220° C., finally ending the esterification when a water distillation rate reaches more than 90% of a theoretical value;

(2) Polycondensation adding a catalyst into products of the esterification, then smoothly reducing the pressure to less than 500 Pa within 30-50 min and carrying out the polycondensation at 250-260° C. for 30-50 min, successively, further reducing the pressure to less than 100 Pa and continuing the polycondensation at 265-270° C. for 50-70 min.

4. The preparing method of claim 3, wherein a molar ratio of the terephthalic acid and the 1,4-butanediol is 1:(1.2-2.0), and a total addition of the fluorinated dicarboxylic acid, the tert-butyl branched hexanediol and the 2,5,6,6-tetramethyl-2,5-heptanediol is 3-5 mol % of an amount of the terephthalic acid, wherein a molar ratio of the fluorinated dicarboxylic acid, the tert-butyl branched hexanediol and the 2,5,6,6-tetramethyl-2,5-heptanediol is (3-4):(1-2):(3-4), while an amount of the catalyst, the matting agent and the stabilizer is 0.03-0.05 wt %, 0.20-0.25 wt % and 0.01-0.05 wt % of the amount of the terephthalic acid, respectively.

5. The preparing method of claim 4, wherein the catalyst is tetrabutyl titanate, wherein the matting agent is titanium dioxide, and wherein the stabilizer is triphenyl phosphate, trimethyl phosphate or trimethyl phosphite.

6. The preparing method of claim 5, wherein the modified polyester has a molecular weight of 25000-30000 Da and a molecular weight distribution index of 1.9-2.4.

7. The preparing method of claim 1, wherein the POY process comprises steps of metering, spinneret extruding, cooling, oiling, stretching, heat setting and winding;
wherein the POY process involves the parameters of 265-275° C. for a spinning temperature, 20-22° C. for a cooling temperature, 2800-3000 m/min for a winding speed;
wherein each of the DTY processes comprises steps of filament guiding, hot stretching, false-twisting, heat setting and winding;
wherein the DTY processes involve parameters of 3.5-5.5% for a setting over-feed ratio, 2.5-5.0% for a winding over-feed ratio, 200-220° C. for the first heating chamber temperature, 1.4-1.5 for a draw ratio.

8. A wool-like polyester filament prepared by the preparing method of claim 1, which is characterized by a modified polyester DTY with a monofilament fineness of 2.0-2.7 dtex; wherein the modified polyester has a molecular chain structure composed of terephthalic acid segments, 1,4-butanediol segments, fluorinated dicarboxylic acid segments, tert-butyl branched hexanediol segments and 2,5,6,6-tetramethyl-2,5-heptanediol segments;
wherein the modified polyester is further dispersed with a matting agent and a doped $Bi_2O_3$ powder, and a content of the matting agent is 0.20-0.25 wt %.

9. The wool-like polyester filament of claim 8, wherein the wool-like polyester filament is characterized by mechanical performance indices of breaking strength ≥3.0 cN/dtex, breaking strength CV value ≤5.0%, elongation at break 30.0±4.0%, elongation at break CV value ≤8.0%, boiling water shrinkage rate 6.5±0.5%, oil content 2.5±0.5 wt %, interlacing degree 60±10/m, and crimp ratio 40±4.0%.

10. The wool-like polyester filament of claim 8, wherein the wool-like polyester filament is characterized by dyeing performance indices of dye uptake 90.32-93.27% (dyed at 100° C.), K/S value 22.15-23.42, color fastness to soaping level 4, color fastness to dry crocking level 4, and color fastness to wet crocking >level 4;
and by an intrinsic viscosity drop of 17-20% after a storage at 25° C. and R.H. 65% for 60 months.

11. The wool-like polyester filament of claim 8,
wherein the tert-butyl branched hexanediol is synthesized by means of:
mixing a 300-350 g/L solution of material A and a 200-300 g/L dilute solution of sulfuric acid at a molar ratio of (1.5-2):1 of the material A to the sulfuric acid to form a mixed solution, and adding the mixed solution into an electrolytic cell, then cooling the mixed solution to 10-15° C. and carrying out an electrolytic reduction until a concentration of the material A decreases to less 10 wt %, and finally obtaining the tert-butyl branched hexanediol through a series of processes of cooling crystallization, separation and purification;
wherein the material A is 2,2-methylpropionaldehyde, 2,2-dimethyl-3-pentanone or 2,2,4,4-tetramethyl-3-pentanone when R in Formula 1 stands for —H, —$CH_2CH_3$ or —$C(CH_3)_3$, respectively;
wherein the 2,5,6,6-tetramethyl-2,5-heptanediol is synthesized by means of:

(1) mixing KOH, 3-methyl-3-hydroxybutyne, 3,3-dimethyl-2-butanone and isopropyl ether in a molar ratio of (1-1.2):1:(1.2-1.3):(2.0-3.0), then carrying out the reaction in an ice bath for 2-4 hrs, finally obtaining octyne diol through a series of processes of cooling crystallization, centrifugation, washing, refining and drying, (2) mixing the octyne diol, an alcohol and a Pd catalyst in a weight ratio of (2-3):10:(0.01-0.03), then carrying out the reaction with a continuous hydrogen input at 40-50° C. for 50-60 min, finally obtaining the 2,5,6,6-tetramethyl-2,5-heptanediol through a series of processes of separation and purification.

12. The wool-like polyester filament of claim 11,
wherein the modified polyester is prepared by means of:
(1) Esterification
concocting the terephthalic acid, the 1,4-butanediol, the fluorinated dicarboxylic acid, the tert-butyl branched hexanediol and the 2,5,6,6-tetramethyl-2,5-heptanediol into a slurry, then adding in the matting agent and a stabilizer and carrying out the esterification in a nitrogen atmosphere with a pressure 1 KPa less than an absolute pressure at 180-220° C., finally ending the esterification when a water distillation rate reaches more than 90% of a theoretical value;

(2) Polycondensation adding a catalyst into products of the esterification, then smoothly reducing the pressure to less than 500 Pa within 30-50 min and carrying out the polycondensation at 250-260° C. for 30-50 min, successively, further reducing the pressure to less than 100 Pa and continuing the polycondensation at 265-270° C. for 50-70 min.

13. The wool-like polyester filament of claim 12, wherein a molar ratio of the terephthalic acid and the 1,4-butanediol is 1:(1.2-2.0), and a total addition of the fluorinated dicarboxylic acid, the tert-butyl branched hexanediol and the 2,5,6,6-tetramethyl-2,5-heptanediol is 3-5 mol % of an amount of the terephthalic acid, wherein a molar ratio of the fluorinated dicarboxylic acid, the tert-butyl branched hexanediol and the 2,5,6,6-tetramethyl-2,5-heptanediol is (3-4):(1-2):(3-4), while an amount of the catalyst, the matting agent and the stabilizer is 0.03-0.05 wt %, 0.20-0.25 wt % and 0.01-0.05 wt % of the amount of the terephthalic acid, respectively.

14. The wool-like polyester filament of claim 13, wherein the catalyst is tetrabutyl titanate, wherein the matting agent is titanium dioxide, and wherein the stabilizer is triphenyl phosphate, trimethyl phosphate or trimethyl phosphite.

15. The wool-like polyester filament of claim 8, wherein the modified polyester has a molecular weight of 25000-30000 Da and a molecular weight distribution index of 1.9-2.4.

16. The wool-like polyester filament of claim 8, wherein the POY process comprises steps of metering, spinneret extruding, cooling, oiling, stretching, heat setting and winding;

wherein the POY process involves the parameters of 265-275° C. for a spinning temperature, 20-22° C. for a cooling temperature, 2800-3000 m/min for a winding speed;

wherein each of the DTY processes comprises steps of filament guiding, hot stretching, false-twisting, heat setting and winding;

wherein the DTY processes involve parameters of 3.5-5.5% for a setting over-feed ratio, 2.5-5.0% for a winding over-feed ratio, 200-220° C. for the first heating chamber temperature, 1.4-1.5 for a draw ratio.

* * * * *